United States Patent [19]

Girvin, III

[11] 3,832,901
[45] Sept. 3, 1974

[54] FUEL LEVEL INDICATOR FOR A MOTORCYCLE

[75] Inventor: Robert H. Girvin, III, Holliston, Mass.

[73] Assignee: KG Engineering, Inc., Holliston, Mass.

[22] Filed: Oct. 26, 1972

[21] Appl. No.: 301,225

[52] U.S. Cl................. 73/325, 116/118 R, 280/5 A
[51] Int. Cl............................................. G01f 23/02
[58] Field of Search...................... 73/323, 325, 326; 116/118 R; 280/5 A; 251/118; 206/DIG. 18; 248/205 A

[56] References Cited
UNITED STATES PATENTS

| 1,601,998 | 10/1926 | Craine | 73/323 |
| 1,663,382 | 3/1928 | Merkel et al. | 251/118 X |
| 2,833,148 | 5/1958 | Hoyt et al. | 73/323 |
| 3,183,716 | 5/1965 | Lyon | 73/323 |
| 3,187,936 | 6/1965 | Downing | 280/5 A |
| 3,311,267 | 3/1967 | Lee et al. | 73/323 X |

Primary Examiner—Richard C. Queisser
Assistant Examiner—Daniel M. Yasich

[57] ABSTRACT

A gasoline level indicator for a motorcycle having the fuel tank in front of the operator's seat consists of a transparent plastic tube vented at the top running downward over the tank and connects to the fuel line from beneath the tank. The tube is contoured to lie flat on the outside of the tank in full view of the operator so that the operator can observe the level of fuel in the tube which is the same as the level in the tank.

6 Claims, 6 Drawing Figures

PATENTED SEP 3 1974  3,832,901
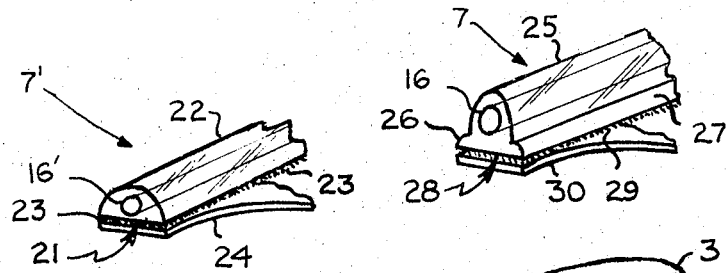
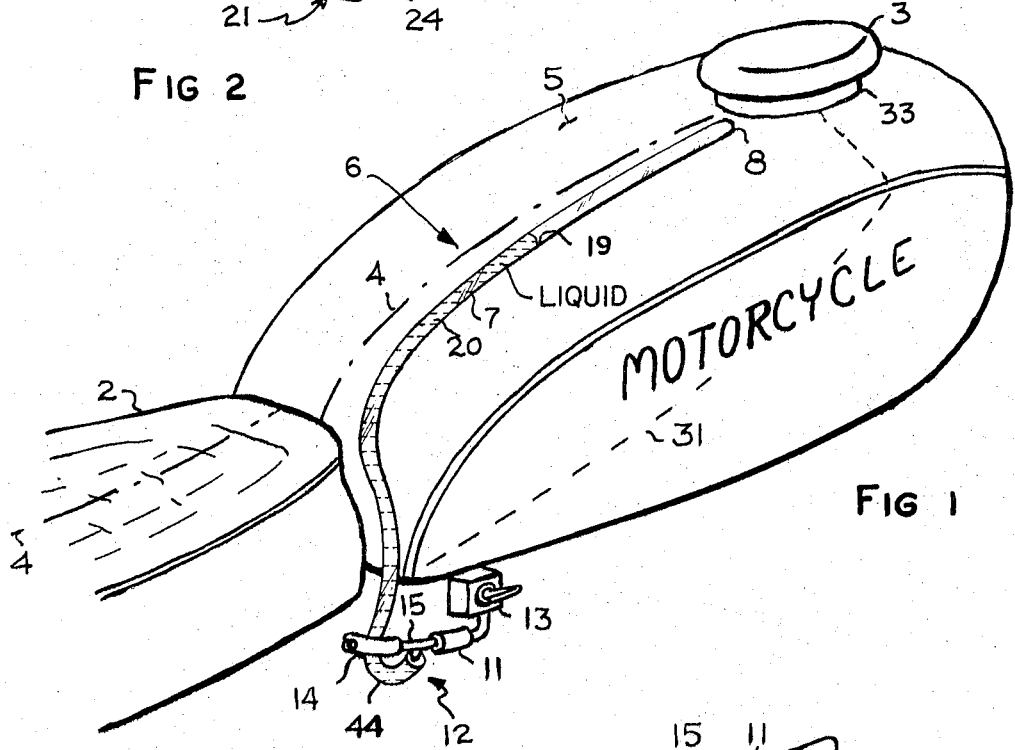
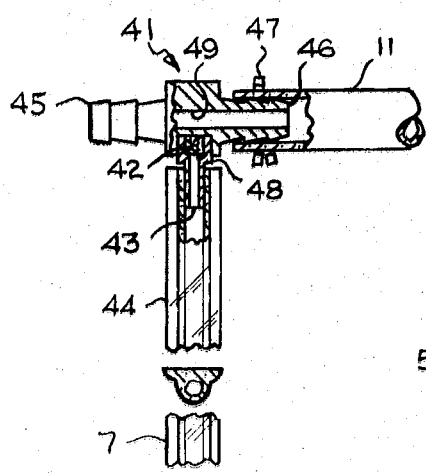
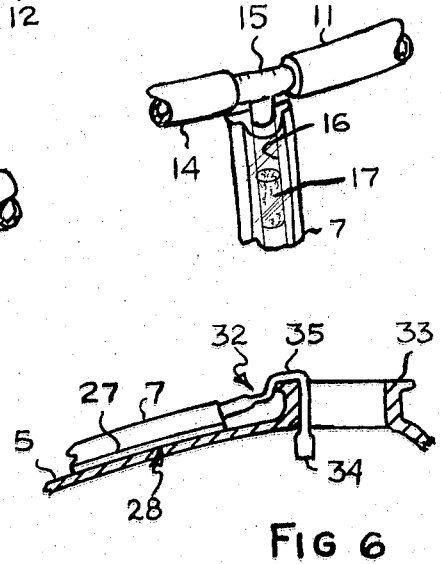

FUEL LEVEL INDICATOR FOR A MOTORCYCLE

This invention relates to fuel level indicators which provide a visual indication of the level of fuel in a tank, and more particularly to fuel level indicators where the fuel level is indicated by a sight tube.

Visual sight gages which indicate the level of fluid in a tank or container are used for many purposes. For example, they are used to show the level of liquid in stationary tanks, the level of water in a coffee pot or the level of gasoline in the fuel tank on a vehicle. The usual form of a liquid level sight gage for any of these purposes is a glass tube connected at the bottom to the bottom of the tank. The glass tube is vented at the top and is displayed where it can be conveniently observed by the user or operator. Clearly, such indicators show the common level of fluid in the glass tube and in the tank and they are very simple and effective for tanks which are either stationary or maintained substantially upright at all times.

Heretofore, such sight level indicators have not been employed to indicate the level of fuel in the fuel tank of a motorcycle, because the glass tube is too easily damaged on a motorcycle and motorcycles are not maintained in an upright position at all times. If the sight glass were located on one side of the fuel tank of a motorcycle and the cycle tipped over on that side, fuel would spill out of the sight glass even before the cycle had tipped all the way over, and there is a high liklihood that the sight glass would be broken. Other difficulties that would be encountered if one used a typical sight glass to show the fuel level in the tank of a motorcycle arise as a consequence of the relative positions of the operator of the cycle and the fuel tank. Normally, the operator straddles a seat and the fuel tank is directly in front of and on the same level as the seat. Hence, a sight glass alongside the fuel tank disposed vertically would be in front of the operator's knee and very difficult for the operator to see while riding the cycle.

In operation of a motorcycle, the fuel sloshes in the motorcycle tank due to the ordinary pitching and tilting of the cycle and this would produce transcient flows into and out of a sight glass fuel level indicator making it difficult to read. Furthermore, where an air tight fill cap is used on the motorcycle fuel tank, the pressure on the fuel in the tank increases as the fuel heats slightly in the tank which would produce an error in a sight glass level indicator that is vented to the atmosphere.

For at least these reasons there has been no successful adaptation of the conventional sight glass fuel level indicator for showing the level of fuel in the fuel tank of a motorcycle.

It is the principal object of the present invention to provide a sight level indicator for indicating the fuel level in the fuel tank of a motorcycle which can be observed conveniently by the operator while riding the cycle.

It is another object to provide a fuel level indicator for the fuel tank of a motorcycle.

It is another object to provide a sight level indicator for the fuel tank of a motorcycle which can be conveniently observed by the operator riding the cycle and which is not located where it may hinder the operator or is likely to be damaged.

It is a further object to provide a fuel level indicator for the fuel tank of a motorcycle which is relatively inexpensive and relatively easy to install on any of a number of different makes of motorcycles.

It is another object to provide a sight level indicator for the fuel tank of a motorcycle which leaks little or no fuel when the cycle is turned over on either side.

In conjunction with the foregoing purpose it is a further object to provide means for damping the flow of fluid from the tank of the motorcycle to the sight level indicator.

It is another object to provide a sight level indicator for the fuel tank of a motorcycle for which changing pressure in the tank does not produce an error in the indicator.

In accordance with features of the present invention shown in an embodiment of the invention described herein, a transparent plastic tube (which may be shaped in a flat strip) is attached to the outside of the fuel tank of a motorcycle, running from the top downward toward the seat and then over the side of the tank for connection by a special Tee adapter to the fuel line which leads from the bottom of the tank to the engine. The adapter contains a damper in the arm thereof that attaches to the strip and so the rate of flow of fuel from the tank into the strip is substantially dampened. This damping is sufficient to prevent fuel from flowing in and out of the strip due to bouncing, pitching and tipping of the motorcycle in ordinary use which causes the fuel to slosh in the tank and should the cycle tip over on its side, the damping limits the leakage of fuel from the open end of the tube if it is vented to the atmosphere, so that little or no fuel leaks from this tube when the cycle is turned over. Another feature includes an adhesive along the flat surface of the tube covered with a removeable backing material to protect the adhesive. This permits easy installation of the flexible tube by simply stripping the backing of the tube and sticking the tube to the fuel tank of the cycle by the exposed adhesive.

Other objects, features and advantages of the present invention are apparent from the following description of embodiments of the invention taken in conjunciton with the figures which illustrate these embodiments. In these figures:

FIG. 1 is a three-quarter view of part of a typical motorcycle showing the seat, fuel tank and tank fill cap and the sight level indicator constructed and installed on the fuel tank in accordance with features of the present invention;

FIG. 2 and 3 are enlarged views of the sight level strip showing two different cross section configurations of the strip;

FIG. 4 is an enlarged view of the lower end of the strip containing a damper and connecting to the fuel line from the tank by a Tee shaped connector;

FIG. 5 is a further enlarged view, partially in cross-section, showing details of the Tee connector and the attachment of the strip and the fuel line thereto; and FIG. 6 is a cross section view of part of the fuel tank alongside the transparent sight level strip adapted to vent into the tank at the fill cap.

Turning first to FIG. 1 there is shown the portion of a motorcycle on which the sight level indicator of the present invention is attached. This figure shows the motorcycle fuel tank 1 just in front of the motorcycle seat 2. The tank fill cap 3 is at the top of the tank. This portion of a typical motorcycle is familiar to all and the general manner of operation of a motorcycle is also familiar to all. The relative positions of the tank and seat, the tank being in front of the seat and at substantially the same level as the seat, is the most common arrangement, and in fact, any other arrangement would be considered unusual. Furthermore, the tank and seat are usually symetrically shaped about a plane which passes vertically through the longitudinal axis of the motorcycle when it is in an upright position. This plane is represented by the broken line 4 shown in the figure.

The operator of the motorcycle sits astride the seat 2 with his feet below and on each side of the tank and with his arms extending above the tank to handlebars located in front of the tank. In this normal position of operation, the operator can readily glance downward and observe the top surface 5 of the tank between the tank fill cap 3 and the seat 2. This surface usually slopes downward from the fill cap 3 toward the seat 2 and so the surface 5 is a convenient part of the tank on which to locate the sight level indicator 6.

The sight level indicator 6 consists essentially of a strip 7 of transparent flexible plastic tubing adapted for attachment to the outside surface of the fuel tank. The vented or open end 8 of this strip is located at the top of the tank or near the fill cap, as the fill cap is usually located at the top of the tank. From that point, the tube extends downward along the outside of the fuel tank, such as along surface 5 of the fuel tank in full view of the operator and connects to the fuel line 11 from the bottom of the tank at 12 below. Fuel flow from the tank is usually controlled by a fuel on-off valve 13 which leads from the bottom of the tank to the line 11. From the connection at 12, the line 14 extends to the motorcycle engine. An enlarged view of the connection 12 is shown in FIG. 4.

The connection at 12 may consist of a Tee shaped fitting 15 having two arms which connect respectively, to fuel lines 11 and 14 and a third arm connected to the tube 16, formed in the strip 7. In the tube 16 just beyond the Tee fitting, is a damper body 17 which restricts the rate of flow of fuel from the fuel line 11 into the tube 16 formed in the strip 7. This damper may be simply a piece of fibrous material which is inert to the fuel, for example, it may be a plug of felt or it may be a small orifice.

The purpose of the damper 17 is to limit the rate of flow of fuel into the tube 16 formed in the strip 7. The flow is limited so that the sloshing of fuel within the tank which occurs in normal use of the motorcycle and which would ordinarily produce short transient flows of fuel into and out of the tube 16, are substantially dampened. The sloshing of fuel in the tank would not normally cause the level of fuel in the tube 16 in the strip to overflow and dribble out of the vented end at 8, because the tube 16 in the strip is quite narrow and instrinsically offers substantial resistance to such flow. The purpose of the damper 17 is to further insure that the effects of fuel sloshing in the tank are dampened in the strip 7. In addition, when the cycle is tipped over on either side, little or no fuel will flow out of the vented end 8 of the stip even when the cycle lies on its side for long periods of time. This problem of fuel leakage from the vented end of the strip 7 is totally avoided by venting the open end into the top of the tank in a manner such as shown in FIG. 6.

The strip 7 is preferrably shaped to provide a flat surface along at least that portion of the total length of the strip which can be conveniently attached to the outside surface of the motorcycle tank 1. In addition, the strip is shaped to offer a clear view to the operator of the level of fuel, as at 19, in the tube 16 in the strip. Two suitable cross section shapes of the strip are illustrated in the enlarged views shown in FIGS. 2 and 3. In FIG. 2 the strip 7' containing tube 16' has a flat side 21 and a rounded side 22. The strip is made of substantially clear plastic material that is sufficiently flexible to follow the contours of the gas tank that it is attached to. The curvature of the surface 22 may be such as will somewhat magnify the image of the column of fuel 20 in the strip for the observer.

In addition, this shape causes only a slight obstruction as it lies quite flush against the outside surface of the fuel tank and it provides a substantial thickness of plastic about the tube 16 which protects the tube from puncture.

The flat surface 21 of the strip is preferrably coated with an adhesive material 23 covered with a removeable backing material 24 that protects the adhesive until the strip is attached to the tank. At attachment, the backing 24 is stripped off and the plastic strip 7 is pressed firmly against the outside of the tank at the desired position so that it will adhere thereto.

The strip may also be shaped as shown in FIG. 3 having a rounded portion 25 and extending edges 26 and 27 to increase the width of the flat part 28 of the strip. A strip with this shape offers a better view of the fuel in the tube 16 from the side and also tends to magnify the image of the column of fuel in the strip. Here again it is convenient to provide an adhesive 29 along the flat portion 28 covered with a backing strip 30 to protect the adhesive until the flexible plastic strip is attached to the cycle fuel tank.

With this cross section configuration, the strip 7 can be viewed readily by the operator to ascertain tank fuel level even when the strip is attached to the side of the tank, as along broken line 31. More particularly, the fuel level in the strip can be viewed from the side parallel to the surface of attachment as well as perpendicular to the surface of attachment. This allows locating the strip, for example, along a line of constant slope downward along the outside of the tank providing a linear indication of fuel level.

Leakage of fuel from the vented end 8 of the strip could occur when the motorcycle is laid on its side. However, this is only a minor problem, because the leakage would be very small and restricted by the damper 17. This problem is entirely avoided by venting the end of the strip into the top of the tank using the simple structure shown in FIG. 6. As shown here, a piece of tubing 32 shaped to fit over the lip 33 to which the tank fill cap attaches, vents the strip into the tank at 34 and so leakage from the end of the strip is returned to the tank. Since the tank and vent pressures are the same, changes in this pressure will not cause any error in the fuel level indication by the strip.

The piece of tubing 32 may be substantially flattened at 35 where the piece fits over the lip 33 so that it will not obstruct the cap when the cap is attached to the lip.

The flexible plastic strip 7 with a tube 16 formed throughout the length of the strip is conveniently provided as part of a kit for installation on any motorcycle.

The kit would provide a length of the flexible transparent tube, a portion of which is shaped as shown in FIGS. 2 and 3 and equipped with adhesive and a removeable backing strip on the flat side. The rest of this tube that extends beyond the tank of the motorcycle to the fuel line may be without adhesive and backing. This length of tube from the kit would be attached to the tank by first stripping the backing off the one portion and sticking that portion to the tank beginning at the bottom edge of the tank as at 36 and extending downwards along the tank as shown to the top of the tank (near the tank fill cap 3) and cutting the remaining end of that portion off as at 8. Then the other portion of the length of the tube (shown as 44), leading to the connector at 12 would be cut off to fit to the connector. Thus, there would be no adhesive and backing on the portion of the tube extending beyond the lower edge of the tank. Both portions of the transparent flexible tube would be sufficiently long to accomodate attachment in this manner to any of many models and makes of motorcycles. Thus, a standard piece of tubing would be provided for attachment to just about any motorcycle and the attachment could be accomplished without the use of any tools except perhaps a knife or a pair of scissors to cut the tube.

The Tee connector 15 at 12 may be a conventional connector for connecting flexible tubes or the special Tee connector 41 shown in FIG. 5 could be used. This special connector contains a damper plug 42 in the end of arm 43. This arm inserts into the end 44 of the flexible plastic tube 7. The Tee also has two arms 45 and 46 which are barbed shaped for insertion into the fuel lines 11 and 14 and are secured thereto by tube clips such as 47. The arm 43 is a tubular extension having a cavity on the end 48 thereof which is inserted into the body of the Tee connector. Within this cavity is contained the plug of suitable material to dampen the flow of fuel into and out of the tube 7 from the main channel 49 through the Tee that extends from fuel line 11 to fuel line 14. The damper plug 42 may be felt or it may be a small orifice or it may be other porous material which is inert to the fuel. The purpose of the damper plug is to limit the flow rate of the fuel just sufficiently to accomplish the purposes described herein.

The kit mentioned above for installing the fuel level indicator on just about any motorcycle could include a Tee fitting such as 41 and a piece of partially flattened soft metal tubing like 32 in addition to the length of transparent flexible strip 7 as described.

From the foregoing description of embodiments of the present invention which represent the best known uses of the invention, it is seen that a novel and advantageous fuel level indicator is provided for a motorcycle. While the structures described herein represent the preferred embodiment of the invention certain minor changes may be made therein without the departing from the spirit and scope of the invention as set forth in the appended claims.

What is claimed is:

1. A fuel level indicator for the fuel tank of a motorcycle comprising,
  a length of flexible transparent plastic strip having formed therein a tube passage from one end to the other of the strip,
  said tube being vented at one end and connected at the other end to the fuel line from the bottom of the tank,
  said length of plastic strip being attached along a portion thereof contiguous to the outside of the tank from a point substantially at the top of the tank to a point substantially at the bottom of the tank with the vented end of the tube at the top of the tank and extending downward therefrom on the tank substantially within the view of the operator of the motorcycle,
  whereby fuel from the tank fills the tube to a level in the tube even with the level of fuel in the tank, said level in the tube being visible to the operator, and a connector having one arm adapted for connection to the other end of the transparent tube, two other arms adapted for connection in the fuel line and containing in said one arm means for damping the flow of fuel into and out of the transparent tube without damping the flow of fuel in the fuel line.

2. A fuel level indicator as in claim 1 wherein,
  one side of said strip along the length thereof is substantially flat, and
  the length of transparent strip has an adhesive on the said flat side for attachment to the outside of the fuel tank.

3. A fuel level indicator as in claim 2 wherein,
  only a portion of the length of the transparent strip has an adhesive on the said flat side for attachment contiguous to the outside of the tank, and
  the end of said tube extending therefrom is not so attachable to the outside of the fuel tank,
  said portion and said extending end being provided in sufficient length for attachment and connection of the transparent strip to a variety of shapes and sizes of tanks by cutting off the ends thereof to attach and connect the strip to a particular tank.

4. A fuel level indicator as in claim 1 wherein,
  the transparent strip is so shaped in cross section that the axis of the inside of the transparent tubing is sufficiently raised from the outside surface of the tank when the flat side thereof is contiguous with the outside surface of the tank that the fuel level in the tube is readily visible to the operator viewing the fuel in the tube through the rounded side of the tube in a direction along the said outside surface of the tank.

5. A fuel level indicator as in claim 1 wherein,
  the transparent tube is vented at the one end into the top of the tank.

6. A fuel level indicator as in claim 1 wherein,
  at least a portion of the outside surface of the strip is curved, and
  the radius of the tube is substantially less than the radius of curvature of the curved side of the strip,
  whereby the transparent strip magnifies the image of fuel in the tube visible to the operator.

* * * * *